(No Model.)
P. MORAN.
VEHICLE HUB.
No. 280,217. Patented June 26, 1883.
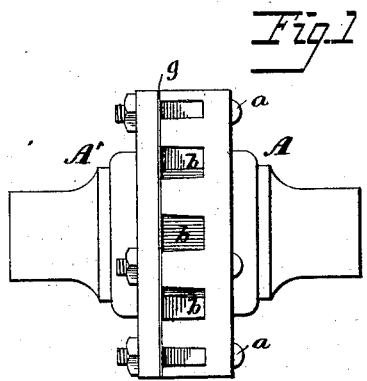
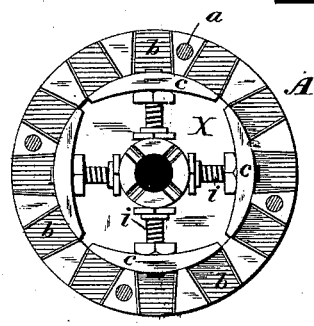
Attest:
Courtney A. Cooper
William Paxton
Patrick Moran
By his Attorney
Charles E. Foster

UNITED STATES PATENT OFFICE.

PATRICK MORAN, OF GRAFTON, WEST VIRGINIA.

VEHICLE-HUB.

SPECIFICATION forming part of Letters Patent No. 280,217, dated June 26, 1883.

Application filed July 3, 1882. (No model.)

*To all whom it may concern:*

Be it known that I, PATRICK MORAN, of Grafton, Taylor county, West Virginia, have invented certain Improvements in Vehicle-Hubs, of which the following is a specification.

My invention is an improvement in that class of vehicle-hubs in which devices are employed for setting the spokes out toward the rim; and my invention consists in constructing the parts, as fully described hereinafter, so as to secure the spokes firmly in place and prevent any movement or rattling.

In the drawings, Figure 1 is an external view of a hub, showing my improvements. Fig. 2 is a face view of one of the sections of the hub.

The hub consists of two sections, A A', bolted face to face by screws or bolts $a$. The section A has a circular chamber, X, and peripheral sockets $b$, for the ends or tenons of the spokes, against which bear segments $c$, arranged within the chamber X and thrust outward by means of screws or bolts $i$. When the section A' is applied to the section A it closes the sides of the sockets $b$.

Before my invention it was proposed to make the sockets $b$ of uniform width, so that in case of the shrinkage of the spokes they would become loose, and could not be tightened except by removing them, and the movement of the loose spokes bearing upon the segments $c$ caused them to rattle and make a disagreeable noise, and results in the displacement of the parts. To avoid this I make the sockets $b$ wider toward the sides closed by the section A', so that when the latter is drawn toward the section A the tenon will be compressed and condensed and forced so tightly in its socket that it cannot become loosened therein. While the tenon is thus tightly held it can be thrust outward by the action of the bolts $i$, inasmuch as the sockets are made with parallel faces.

A washer, $g$, may be interposed between the plates A and A', as shown, and serves to retain oil in the chamber X, for lubricating the journal through openings $s$.

I claim—

The combination, in a vehicle-hub, of a section, A, provided with sockets, open at one side and contracted toward the other, a section, A', intervening packing, $g$, and bolts $a$, and mechanism arranged within the hub to thrust the spokes outward, substantially as set forth.

In testimony whereof I have signed my name to this specification in the presence of two subscribing witnesses.

PATRICK MORAN.

Witnesses:
 GEO. W. BROWN,
 D. W. FOSTER.